United States Patent
Li et al.

(10) Patent No.: US 12,477,007 B2
(45) Date of Patent: Nov. 18, 2025

(54) METHOD FOR DETERMINING TRUSTED TERMINAL AND RELATED APPARATUS

(71) Applicant: HUAWEI TECHNOLOGIES CO., LTD., Guangdong (CN)

(72) Inventors: Le Li, Hangzhou (CN); Huajia Wu, Beijing (CN); Yongqiang Xu, Hangzhou (CN); Xiaolei Cheng, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 243 days.

(21) Appl. No.: 18/350,011

(22) Filed: Jul. 11, 2023

(65) Prior Publication Data

US 2023/0362202 A1    Nov. 9, 2023

Related U.S. Application Data

(63) Continuation of application No. PCT/CN2021/114179, filed on Aug. 24, 2021.

(30) Foreign Application Priority Data

Jan. 12, 2021  (CN) .......................... 202110038960.7

(51) Int. Cl.
*H04L 9/40* (2022.01)
*H04L 67/02* (2022.01)

(52) U.S. Cl.
CPC .............. *H04L 63/20* (2013.01); *H04L 63/08* (2013.01); *H04L 63/0823* (2013.01);
(Continued)

(58) Field of Classification Search
None
See application file for complete search history.

(56) References Cited

U.S. PATENT DOCUMENTS 8,560,834 B2 * 10/2013 Lau ..................... H04L 63/166
726/10
12,153,948 B2 * 11/2024 Kaimal ................ H04L 63/108
(Continued)

FOREIGN PATENT DOCUMENTS

| CN | 103152350 B | * | 8/2017 |
| CN | 107438074 | | 12/2017 |
| WO | 2009140953 A1 | | 11/2009 |

OTHER PUBLICATIONS

International Search Report dated Nov. 23, 2021, issued for International Application No. PCT/CN2021/114179 (9 pages).
(Continued)

*Primary Examiner* — Lashonda Jacobs-Burton

(57) ABSTRACT

A method for determining a trusted terminal and a related apparatus, which are applied to a zero trust network security architecture, improves security of the zero trust architecture. The method includes: a terminal sends an access request when the terminal accesses an application server. A policy control apparatus sends an HTTPS connection request to the terminal based on the access request from the terminal. The terminal sends verification information to the policy control apparatus based on the HTTPS connection request. The policy control apparatus performs verification on the verification information. After the verification on the verification information succeeds, the terminal successfully establishes an HTTPS connection to the policy control apparatus. The HTTPS connection indicates that the terminal is a trusted terminal.

19 Claims, 4 Drawing Sheets

(52) U.S. Cl.
CPC ............ *H04L 63/10* (2013.01); *H04L 63/168* (2013.01); *H04L 67/02* (2013.01)

(56) References Cited

U.S. PATENT DOCUMENTS

| | | | |
|---|---|---|---|
| 2002/0133700 A1 | 9/2002 | Maurin et al. | |
| 2012/0072979 A1* | 3/2012 | Cha .................... | H04W 12/069 726/8 |
| 2014/0165147 A1* | 6/2014 | Hershberg ............ | H04L 63/083 726/4 |
| 2014/0289511 A1* | 9/2014 | Tuch .................. | H04L 63/0272 713/156 |
| 2016/0189147 A1* | 6/2016 | Vanczak ............. | H04L 63/0853 705/71 |
| 2016/0373263 A1* | 12/2016 | Zaidi .................... | H04L 9/3265 |
| 2016/0373434 A1* | 12/2016 | Xie ...................... | H04L 9/3263 |
| 2018/0324209 A1 | 11/2018 | Zhang | |
| 2019/0052630 A1* | 2/2019 | Lapidous ............ | H04L 63/0853 |
| 2023/0362202 A1* | 11/2023 | Li .......................... | H04L 67/02 |

OTHER PUBLICATIONS

Extended European Search Report dated Apr. 4, 2024, issued for European Application No.

\* cited by examiner

METHOD FOR DETERMINING TRUSTED TERMINAL AND RELATED APPARATUS

CROSS-REFERENCE TO RELATED APPLICATIONS

This application is a continuation of International Application No. PCT/CN2021/114179, filed on Aug. 24, 2021, which claims priority to Chinese Patent Application No. 202110038960.7, filed on Jan. 12, 2021. The disclosures of the aforementioned applications are hereby incorporated by reference in their entireties.

TECHNICAL FIELD

This disclosure relates to the field of network security technologies, and in particular, to a method for determining a trusted terminal in a zero trust secure network architecture and a related apparatus.

BACKGROUND

With development of informatization technologies such as mobile internet, big data, and cloud computing, accompanying network risks and threats are increasing. A conventional security defense mode in which a trust system is established based on network borders gradually fails, and therefore a zero trust network security technology emerges. A zero trust architecture is a security architecture that implements access control centered on an identity of an access subject.

The zero trust architecture is used to establish a secure and trusted relationship between an access subject (a terminal) and an access object (a service application and a data resource). Generally, the zero trust architecture includes a terminal, a policy detection apparatus, a policy control apparatus, and a policy execution apparatus. An environment awareness client is deployed in the terminal, and the environment awareness client collects a security risk event (such as a Trojan horse or virus attack) of the terminal in real time. The policy detection apparatus obtains the network security risk event of the terminal, and evaluates a security risk of the terminal based on the security risk event, to obtain an evaluation result. The policy control apparatus adjusts access permission of the access subject based on the evaluation result. The policy execution apparatus permits or blocks access of the access subject according to a policy delivered by the policy control apparatus, to dynamically adjust access permission of the access subject for an application system.

A security defense mode in the zero trust architecture can be implemented based on a trusted and reliable terminal. If the terminal is unreliable and insecure, the entire zero trust architecture cannot function. Therefore, determining whether the terminal in the zero trust architecture is trusted is a basis and a key step for the zero trust architecture to function.

In a conventional method, after an environment awareness client is deployed in a terminal, the terminal sends a registration message to a policy detection apparatus. After receiving the registration message, the policy detection apparatus determines that the terminal is a trusted terminal. Similarly, when the environment awareness client is uninstalled from the terminal, the terminal sends an uninstall message to the policy detection apparatus. After receiving the uninstall message sent by the terminal, the policy detection apparatus determines that the terminal is an untrusted terminal. In other words, the policy detection apparatus passively receives the registration message or the uninstall message sent by the terminal, and determines, based on the registration message and the uninstall message, whether the terminal is trusted. However, in some cases, the policy detection apparatus cannot correctly determine whether the terminal is a trusted terminal or an untrusted terminal, resulting in a security risk in a zero trust system. For example, after the environment awareness client is deployed in the terminal, if the environment awareness client is uninstalled from the terminal when a network is disconnected, the policy detection apparatus cannot receive the uninstall message. For another example, if the environment awareness client is abnormally uninstalled because an operating system is re-deployed in the terminal, and the like, the policy detection apparatus cannot receive the uninstall message sent by the environment awareness client. In these cases, because the policy detection apparatus does not receive the uninstall message, the policy detection apparatus still determines that the terminal is a trusted terminal, but actually the terminal is untrusted currently. In the zero trust architecture in the conventional method, whether the terminal is a trusted terminal cannot be correctly determined, and consequently the entire zero trust architecture cannot function.

SUMMARY

Embodiments of this disclosure provide a method for determining a trusted terminal. The method is applied to a zero trust network security architecture, to improve security of the zero trust architecture.

According to a first aspect, an embodiment of this disclosure provides a method for determining a trusted terminal, applied to a terminal. An environment awareness client is installed in the terminal. The method includes: The terminal sends an access request when the terminal accesses an application server. The access request is used to trigger a policy control apparatus to send an HTTPS connection request. Then the terminal receives the HTTPS connection request sent by the policy control apparatus. After receiving the HTTPS connection request, the environment awareness client installed in the terminal sends verification information to the policy control apparatus based on the HTTPS connection request. The verification information is used by the policy control apparatus to perform verification on the terminal. The terminal establishes an HTTPS connection to the policy control apparatus when the verification performed by the policy control apparatus on the terminal succeeds. In other words, the environment awareness client establishes an HTTPS connection to the policy control apparatus. The HTTPS connection established between the terminal and the policy control apparatus indicates that the terminal is a trusted terminal. In this embodiment, the terminal cannot send the verification information to the policy control apparatus, regardless of whether a user actively uninstalls the environment awareness client installed in the terminal, or the environment awareness client is passively uninstalled because of system reinstallation of the terminal and the like. It may be understood that, when the policy control apparatus does not receive the verification information from the terminal, the terminal cannot successfully establish the HTTPS connection to the policy control apparatus, which indicates that the terminal is no longer reliable. To be specific, the environment awareness client cannot collect a dangerous event of the terminal. In this case, the policy control apparatus determines that the terminal is an untrusted terminal.

The policy control apparatus correctly determines, based on the HTTPS connection successfully established to the terminal, that the terminal is a trusted terminal, thereby improving security of a zero trust architecture, and enabling the zero trust architecture to achieve a function properly.

In an optional implementation, the verification information is included in a secure sockets layer SSL certificate. After obtaining the verification information sent by the terminal, the policy control apparatus first reads content in the certificate, and then performs verification on the content in the certificate, to prevent the terminal from being spoofed and improve security of the zero trust architecture.

According to a second aspect, an embodiment of this disclosure provides a method for determining a trusted terminal, applied to a policy control apparatus. The method includes: The policy control apparatus receives a first access request from a terminal. Then the policy control apparatus sends an HTTPS connection request to an environment awareness client in the terminal based on the first access request. The policy control apparatus receives verification information from the terminal. The verification information is sent by the environment awareness client in the terminal for the HTTPS connection request. The policy control apparatus performs verification on the terminal based on the verification information. The policy control apparatus establishes an HTTPS connection to the terminal when the verification on the terminal succeeds. The HTTPS connection established between the terminal and the policy control apparatus indicates that the terminal is a trusted terminal. The terminal cannot send the verification information to the policy control apparatus, regardless of whether a user actively uninstalls the environment awareness client installed in the terminal, or the environment awareness client is passively uninstalled because of system reinstallation of the terminal and the like. It may be understood that, when the policy control apparatus does not receive the verification information from the terminal, the terminal cannot successfully establish the HTTPS connection to the policy control apparatus, which indicates that the terminal is no longer reliable. To be specific, the environment awareness client cannot collect a dangerous event of the terminal. In this case, the policy control apparatus determines that the terminal is an untrusted terminal. The policy control apparatus correctly determines, based on the HTTPS connection successfully established to the terminal, that the terminal is a trusted terminal, thereby improving security of a zero trust architecture, and enabling the zero trust architecture to achieve a function properly.

In an optional implementation, the method further includes: When the verification on the terminal fails, it indicates that the terminal is spoofed, and the policy control apparatus determines that the terminal is an untrusted terminal. When the policy control apparatus determines that the terminal is an untrusted terminal, the policy control apparatus no longer releases an access request from the terminal, thereby improving the security of the zero trust architecture.

In an optional implementation, the verification information is included in a secure sockets layer SSL certificate.

In an optional implementation, the method further includes: The policy control apparatus receives a second access request redirected by the policy execution apparatus. The second access request is from the terminal, and the second access request does not carry a token allocated by the policy control apparatus. If the second access request does not carry the token allocated by the policy control apparatus, it indicates that the second access request is a request for first access, and the policy execution apparatus redirects the access request from the terminal to the policy control apparatus, so as to trigger the policy control apparatus to send the HTTPS connection request to the terminal, so as to complete a process in which the policy control apparatus establishes the HTTPS connection to the terminal, so that the policy control apparatus determines that the terminal is a trusted terminal.

According to a third aspect, an embodiment of this disclosure provides a method for determining a trusted terminal, applied to a policy execution apparatus. The method includes: The policy execution apparatus receives an access request from a terminal. When the access request does not carry a token allocated by the policy control apparatus, it indicates that the access request is a request for first access, and the policy execution apparatus redirects the access request to the policy control apparatus. After the access request is redirected to the policy control apparatus, the policy control apparatus is triggered to send an HTTPS connection request to the terminal. The HTTPS connection request is used to trigger the terminal to send verification information to the policy control apparatus, and the verification information is used by the policy control apparatus to perform verification on the terminal. The policy execution apparatus triggers, in a redirection manner, the policy control apparatus to send the HTTPS connection request to the terminal, so as to complete a process in which the policy control apparatus establishes an HTTPS connection to the terminal, so that the policy control apparatus determines that the terminal is a trusted terminal, thereby improving security of a zero trust architecture.

In an optional implementation, the verification information is included in a secure sockets layer SSL certificate.

According to a fourth aspect, an embodiment of this disclosure provides a terminal. The terminal includes: a transceiver module, configured to send an access request when the terminal accesses an application server, where the transceiver module is further configured to receive an HTTPS connection request sent by a policy control apparatus, where the HTTPS connection request is sent by the policy control apparatus based on the access request; and the transceiver module is further configured to send verification information to the policy control apparatus based on the HTTPS connection request, where the verification information is used by the policy control apparatus to perform verification on the terminal; and a processing module, configured to establish an HTTPS connection to the policy control apparatus when the verification performed by the policy control apparatus on the terminal succeeds, where the HTTPS connection established between the terminal and the policy control apparatus indicates that the terminal is a trusted terminal.

According to a fifth aspect, an embodiment of this disclosure provides a policy control apparatus. The policy control apparatus includes: a transceiver module, configured to receive a first access request from a terminal, where the transceiver module is further configured to send an HTTPS connection request to the terminal based on the first access request; and the transceiver module is further configured to receive verification information from the terminal, where the verification information is sent by the terminal for the HTTPS connection request; and a processing module, configured to perform verification on the terminal based on the verification information, where the processing module is further configured to establish an HTTPS connection to the terminal when the verification on the terminal succeeds, where the HTTPS connection established between the policy control apparatus and the terminal indicates that the terminal is a trusted terminal.

In an optional implementation, the processing module is further configured to: when the verification on the terminal fails, determine that the terminal is an untrusted terminal.

In an optional implementation, the transceiver module is further configured to receive a second access request redirected by the policy execution apparatus. The second access request is from the terminal, and the second access request does not carry a token allocated by the policy control apparatus.

According to a sixth aspect, an embodiment of this disclosure provides a policy execution apparatus. The policy execution apparatus includes: a transceiver module, configured to receive an access request from a terminal; and a processing module, configured to redirect the access request to a policy control apparatus when the access request does not carry a token allocated by the policy control apparatus. After the access request is redirected to the policy control apparatus, the policy control apparatus is triggered to send an HTTPS connection request to the terminal. The HTTPS connection request is used to trigger the terminal to send verification information to the policy control apparatus. The verification information is used by the policy control apparatus to perform verification on the terminal.

According to a seventh aspect, an embodiment of this disclosure provides a system for determining a trusted terminal. The system includes: a terminal, configured to send a first access request when accessing an application server; and a policy control apparatus, configured to receive the first access request, and send an HTTPS connection request to the terminal based on the first access request. The terminal is further configured to receive the HTTPS connection request, and send verification information to the policy control apparatus based on the HTTPS connection request. The policy control apparatus is further configured to receive the verification information, perform verification on the terminal based on the verification information, and the policy control apparatus establishes an HTTPS connection to the terminal when the verification on the terminal succeeds. The HTTPS connection established between the policy control apparatus and the terminal indicates that the terminal is a trusted terminal.

In an optional implementation, the system further includes a policy execution apparatus. The policy execution apparatus is configured to receive a second access request from the terminal, where the second access request does not carry a token allocated by the policy control apparatus, and redirect the second access request to the policy control apparatus. The policy control apparatus is further configured to receive the second access request redirected by the policy execution apparatus, and send an HTTPS connection request to the terminal based on the second access request.

In an optional implementation, the policy execution apparatus is a network forwarding device. The network forwarding device includes a firewall, a switch, a router, a gateway, and a bridge. The policy control apparatus is a computer device. The policy execution apparatus is communicatively connected to the policy control apparatus. The policy execution apparatus is configured to provide a reverse proxy for the application server, hide the application server from the terminal, and ensure security of the application server. The policy execution apparatus is communicatively connected to the policy control apparatus. After the policy control apparatus determines that the terminal is a trusted terminal, the policy execution apparatus continues to access the application server as a proxy of the terminal. When the policy control apparatus determines that the terminal is an untrusted terminal, the policy execution apparatus does not continue to access the application server, so as to improve security of a zero trust architecture.

In an optional implementation, the policy control apparatus is further configured to: when the verification on the terminal fails, determine that the terminal is an untrusted terminal.

According to an eighth aspect, an embodiment of this disclosure provides an electronic device, including a processor. The processor is coupled to at least one memory. The processor is configured to read a computer program stored in the at least one memory, so that the electronic device performs the method according to any one of the first aspect, or the electronic device performs the method according to any one of the second aspect, or the electronic device performs the method according to any one of the third aspect.

According to a ninth aspect, an embodiment of this disclosure provides a computer-readable medium. The computer-readable storage medium is configured to store a computer program. When the computer program is run on a computer, the computer is enabled to perform the method according to any one of the first aspect, or the computer is enabled to perform the method according to any one of the second aspect, or the computer is enabled to perform the method according to any one of the third aspect.

According to a tenth aspect, an embodiment of this disclosure provides a chip, including a processor and a communication interface. The processor is configured to read instructions to perform the method according to any one of the first aspect, or the processor is configured to read instructions to perform the method according to any one of the second aspect, or the processor is configured to read instructions to perform the method according to any one of the third aspect.

According to an eleventh aspect, an embodiment of this disclosure provides a computer program product. When the computer program product is executed by a computer, the method according to any one of the first aspect is implemented, or when the computer program product is executed by a computer, the method according to any one of the second aspect is implemented, or when the computer program product is executed by a computer, the method according to any one of the third aspect is implemented.

DESCRIPTION OF EMBODIMENTS

The following describes the technical solutions in embodiments of this disclosure with reference to the accompanying drawings in embodiments of this disclosure. A term "and/or" in this disclosure indicates that three relationships exist. For example, A and/or B indicates three cases that only A exists, both A and B exist, and only B exists. In the specification, claims, and accompanying drawings of this disclosure, the terms "first", "second", and the like are intended to distinguish between objects but do not necessarily indicate a specific order or sequence. It should be understood that the terms used in such a way are interchangeable in proper circumstances.

Embodiments of this disclosure provide a method for determining a trusted terminal. The method is applied to a zero trust network security architecture (also referred to as a "zero trust architecture" or a "zero trust system"). The zero trust architecture includes a terminal, a policy detection apparatus, a policy execution apparatus, and a policy control apparatus. An environment awareness client is deployed in the terminal. In the zero trust architecture, the environment awareness client deployed in the terminal is configured to collect a security risk event (such as a Trojan horse or a virus) of the terminal in real time. The policy detection apparatus is configured to obtain a security network risk event of the terminal, and assess a security risk of the terminal based on the security risk event, to obtain an assessment result. The policy control apparatus is configured to adjust access permission of an access subject based on the assessment result. The policy execution apparatus is configured to provide a reverse proxy for an application server, and release or block an access request from the terminal based on a policy delivered by the policy control apparatus, so as to dynamically adjust the access permission of the access subject for the application server.

A basis for implementing a security defense mode of the foregoing zero trust architecture is that the terminal can be trusted and is reliable. If the terminal is unreliable, the zero trust architecture cannot achieve a function properly. In view of this, this disclosure provides a method for determining a trusted terminal. The method is used to correctly determine that the terminal in the zero trust architecture is a trusted terminal (or referred to as a "credible terminal"), thereby improving security of the zero trust architecture.

Figure 1A:
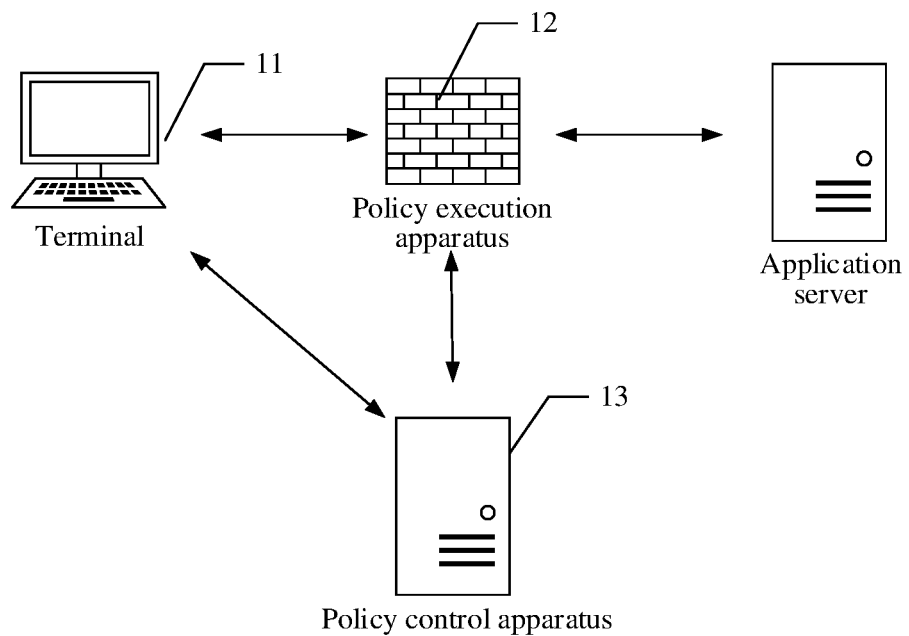
FIG. 1A and FIG. 1B are schematic diagrams of scenarios of two embodiments of a zero trust architecture according to an embodiment of this disclosure.
Figure 1B:
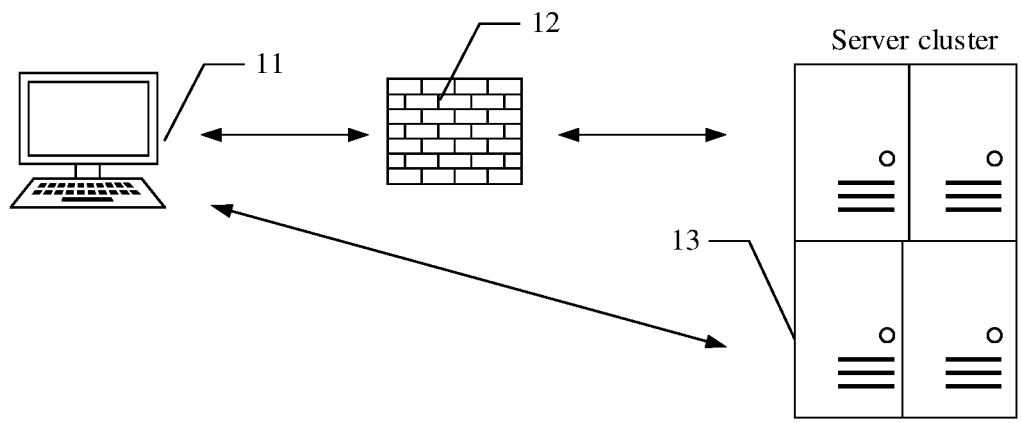

FIG. 1A and FIG. 1B are schematic diagrams of application scenarios of a zero trust architecture according to an embodiment of this disclosure. Refer to FIG. 1A and FIG. 1B. The zero trust architecture includes a terminal 11, a policy execution apparatus 12, and a policy control apparatus 13. An environment awareness client is deployed in the terminal 11. Both the policy control apparatus 13 and the policy execution apparatus 12 are communicatively connected to the terminal. The policy execution apparatus 12 is communicatively connected to the policy control apparatus 13, and the policy execution apparatus 12 is communicatively connected to the application server. The terminal in this disclosure is a terminal that supports a hypertext transfer protocol over secure socket layer (HTTPS) protocol. Optionally, the terminal is a terminal in a mobile phone, a tablet computer (Pad), a computer, a personal computer (PC), an internet of things (IoT) system, or the like. The policy execution apparatus 12 is a network forwarding device, or the policy execution apparatus 12 is a function module deployed in the network forwarding device. The network forwarding device includes but is not limited to a firewall, a switch, a router, a gateway, a bridge, and the like. In this embodiment of this disclosure, an example in which the policy execution apparatus 12 is a firewall is used for description. The policy control apparatus 13 is a computer cluster device, or the policy control apparatus 13 is a function module deployed in the computer cluster device. In this disclosure, an example in which the policy control apparatus 13 is a server is used for description. Optionally, the policy control apparatus 13 is separately deployed. Alternatively, as shown in FIG. 1B, the policy control apparatus 13 and the application server are centrally deployed in a server cluster.

Further, functions of the apparatuses in the zero trust architecture in this disclosure are described.

The policy execution apparatus is configured to determine, based on an access request obtained from the terminal, whether the terminal accesses the application server for the first time. When the terminal accesses the application server for the first time, the access request from the terminal is redirected to the policy control apparatus, so as to trigger the policy control apparatus to send an HTTPS connection request to the terminal.

The policy control apparatus is configured to send an HTTPS connection request to an environment awareness client, receive verification information fed back by the environment awareness client, perform verification on the verification information, and determine, based on an HTTPS connection to the terminal, that the terminal is a trusted terminal.

The environment awareness client is configured to receive the HTTPS connection request sent by the policy control apparatus, and send the verification information to the policy control apparatus.

The policy execution apparatus is further configured to provide a reverse proxy for the application server, and hide the application server from the terminal. When the policy control apparatus determines that the terminal is a trusted terminal, the policy execution apparatus receives a first indication sent by the policy control apparatus, continues to access the application server as a proxy of the terminal, and then feeds back a data resource to the terminal. When the policy control apparatus determines that the terminal is an untrusted terminal, the policy execution apparatus receives a second indication sent by the policy control apparatus, and blocks, based on the second indication, the terminal from accessing the application server (that is, the policy execution apparatus does not continue to access the application server).

In embodiments of this disclosure, in the zero trust architecture, the terminal sends an access request when the terminal accesses the application server. The policy control apparatus sends an HTTPS connection request to the terminal based on the access request from the terminal. The terminal sends verification information to the policy control apparatus based on the HTTPS connection request. The policy control apparatus performs verification on the verification information. After the verification on the verification information succeeds, the terminal successfully establishes an HTTPS connection to the policy control apparatus. The HTTPS connection indicates that the terminal is a trusted terminal. In this embodiment of this disclosure, the terminal cannot send the verification information to the policy control apparatus, regardless of whether a user actively uninstalls the environment awareness client, or the environment awareness client is passively uninstalled because of system reinstallation of the terminal and the like. When the policy control apparatus does not receive the verification information from the terminal, the terminal cannot successfully establish the HTTPS connection to the policy control apparatus, which indicates that the terminal is no longer reliable. To be specific, the environment awareness client cannot collect a danger event of the terminal. In this case, the policy control apparatus determines that the terminal is an untrusted terminal. The policy control apparatus correctly determines, based on the HTTPS connection successfully established to the terminal, that the terminal is a trusted terminal, thereby improving security of the zero trust architecture, and enabling the zero trust architecture to achieve a function properly.

For better understanding of this disclosure, terms involved in this disclosure are first described.

User token: The user token is a character string generated by a server side to serve as a token for a client to send a request. When the client accesses the server side for the first time, the server side generates one token and returns the token to the client. The client only needs to carry the token to request data without carrying a user name and a password again. In this way, pressure on the server side is reduced, and operations of frequently querying the user name and the password in a database are reduced. In this embodiment of this disclosure, the policy control apparatus serves as a server side to allocate a token to the terminal.

Redirect: A network request is redirected, to forward the network request to another location.

Figure 2:
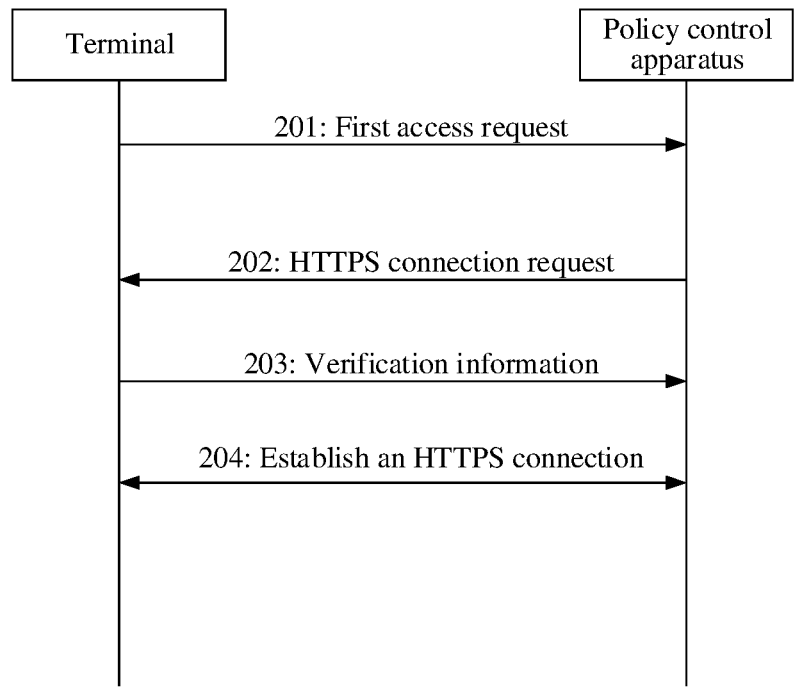
FIG. 2 is a flowchart of a method for determining a trusted terminal according to an embodiment of this disclosure.

Refer to FIG. 2. An embodiment of this disclosure provides a method for determining a trusted terminal, including step 201 to step 204.

Step 201: A terminal sends a first access request when the terminal accesses an application server.

The terminal sends the first access request based on an HTTPS protocol through a browser. The first access request carries a domain name (for example, sina.com) of the application server.

Step 202: A policy control apparatus receives the first access request from the terminal, and sends an HTTPS connection request to the terminal based on the first access request.

The policy control apparatus sends the HTTPS connection request to an environment awareness client in the terminal based on a source address (that is, an IP address of the terminal) carried in the first access request.

Step 203: The terminal receives the HTTPS connection request sent by the policy control apparatus, and sends verification information to the policy control apparatus based on the HTTPS connection request, where the verification information is used by the policy control apparatus to perform verification on the terminal (the environment awareness client).

HTTPS is a protocol used to encrypt data and transmit the encrypted data. The verification information in this embodiment is included in a secure sockets layer (SSL) certificate (or referred to as a "certificate" for short) of the environment awareness client. It may be understood that a public key for data encryption in the HTTPS protocol is represented in a form of a certificate, so as to ensure reliability of the public key. For example, the SSL certificate of the environment awareness client includes a certificate authority (CA), a validity period of the certificate, a public key, a certificate owner, a signature, and the like.

After obtaining the verification information sent by the terminal, the policy control apparatus first reads content in the certificate, and then performs verification on the content in the certificate. A process in which the policy control apparatus performs verification on the SSL certificate is used as an example for description. First, the policy control apparatus searches for a certificate authority CA that is stored and trusted, and compares the certificate authority CA with an issuer CA in the SSL certificate of the environment awareness client, so as to check whether the SSL certificate is issued by a legal authority. If the certificate authority CA is consistent with the issuer CA in the SSL certificate of the environment awareness client, the policy control apparatus determines that the SSL certificate is issued by a legal authority. After determining that the SSL certificate is issued by a legal authority, the policy control apparatus extracts a public key of the issuer CA from an operating system, and then decrypts, by using the public key of the issuer CA, the signature in the SSL certificate sent by the terminal. If the signature in the SSL certificate is successfully decrypted, it proves that the certificate sent by the terminal is valid and not spoofed. In this case, the policy control apparatus reads the public key in the certificate, and the public key in the SSL certificate serves as a key for encrypting information when the policy control apparatus subsequently sends the information to the terminal.

Step 204: The policy control apparatus establishes an HTTPS connection to the terminal after the verification performed by the policy control apparatus on the verification information succeeds, where the HTTPS connection established between the terminal and the policy control apparatus indicates that the terminal is a trusted terminal.

When the verification performed by the policy control apparatus on the verification information succeeds, the policy control apparatus successfully establishes the HTTPS connection to the terminal. After the terminal successfully establishes the HTTPS connection to the policy control apparatus, the policy control apparatus determines that the terminal is a trusted terminal. After the policy control apparatus determines that the terminal is a trusted terminal, the policy control apparatus sends a first indication to a policy execution apparatus. The first indication indicates that the terminal is a trusted terminal. The policy execution apparatus executes a reverse proxy function of the application server. The policy execution apparatus continues to access the application server based on the first indication, and sends, to the terminal, a data resource fed back by the application server. Optionally, the first indication carries the public key in the SSL certificate, and the public key is used to encrypt data transmission between the policy execution apparatus and the terminal.

In a zero trust architecture, a terminal is a trusted terminal and a basis for the zero trust architecture to achieve a function. In this embodiment, both the terminal and the policy control apparatus are devices that support the HTTPS protocol, and the environment awareness client is deployed in the terminal. When the terminal accesses the application server, an access request from the terminal triggers the policy control apparatus to send an HTTPS connection request to the terminal (the environment awareness client). The terminal sends verification information to the policy control apparatus based on the HTTPS connection request. Then the policy control apparatus performs verification on the verification information. After the verification on the verification information succeeds, the policy control apparatus establishes an HTTPS connection to the terminal. Since the terminal can successfully establish the HTTPS connection to the policy control apparatus, it indicates that the environment awareness client in the terminal is not uninstalled. If the verification performed by the policy control apparatus on the verification information sent by the terminal succeeds, it indicates that the terminal is not spoofed. The policy control apparatus determines, based on the HTTPS connection successfully established, that the terminal is a trusted terminal.

Optionally, in two conditions of the verification information that "the verification performed by the policy control apparatus on the verification information fails" and "the policy control apparatus does not receive the verification information from the terminal", when at least one of the two conditions is met, the policy control apparatus determines that the terminal is an untrusted terminal. When the policy control apparatus determines that the terminal is an untrusted terminal, the policy control apparatus sends a second indication to the policy execution apparatus. The second indication indicates that the terminal is an untrusted terminal. After receiving the second indication, the policy execution apparatus does not continue to access the application server. Optionally, the policy execution apparatus feeds back prompt information to the terminal. The prompt information is an error page or the like. For example, a case in which the verification performed by the policy control apparatus on the verification information fails includes: The policy control apparatus determines that the SSL certificate of the environment awareness client is not issued by a legal authority, and/or the policy control apparatus unsuccessfully decrypts, by using the public key of the issuer CA, the signature in the SSL certificate sent by the terminal.

In this embodiment, if the verification performed by the policy control apparatus on the verification information fails, it indicates that the terminal may be spoofed by an attacker, and the policy control apparatus determines that the terminal is an untrusted terminal. If the policy control apparatus does not receive the verification information from the terminal, it indicates that the environment awareness client in the terminal is uninstalled, and the environment awareness client cannot send the verification information to the policy control apparatus based on the HTTPS connection request. In this case, the environment awareness client cannot collect a dangerous event in the terminal, and the policy control apparatus determines that the terminal is an untrusted terminal.

Optionally, after step 204, after the policy control apparatus determines that the terminal is a trusted terminal, the policy execution apparatus receives the first indication sent by the policy control apparatus, and caches the first indication. Duration (for example, 20 minutes) for caching the first indication by the policy execution apparatus is preset. The policy execution apparatus receives a third access request from the terminal. If not receiving, within preset duration (20 minutes), the second indication (the second indication indicates that the terminal is an untrusted terminal) sent by the policy control apparatus, the policy execution apparatus continues to access an application server to be accessed by the third access request. Within the preset duration, if receiving the second indication sent by the policy control apparatus, the policy execution apparatus denies, based on the second indication, access to the application server to be accessed by the third access request.

Optionally, before step 204, this embodiment of this disclosure further includes the following step: The terminal sends an HTTPS response to the policy control apparatus based on the HTTPS connection request. For example, in step 203, the terminal sends the HTTPS response to the policy control apparatus. The HTTPS response carries the verification information. Optionally, after step 203 and before step 204, the method further includes a step: The terminal sends the HTTPS response to the policy control apparatus.

Figure 3:
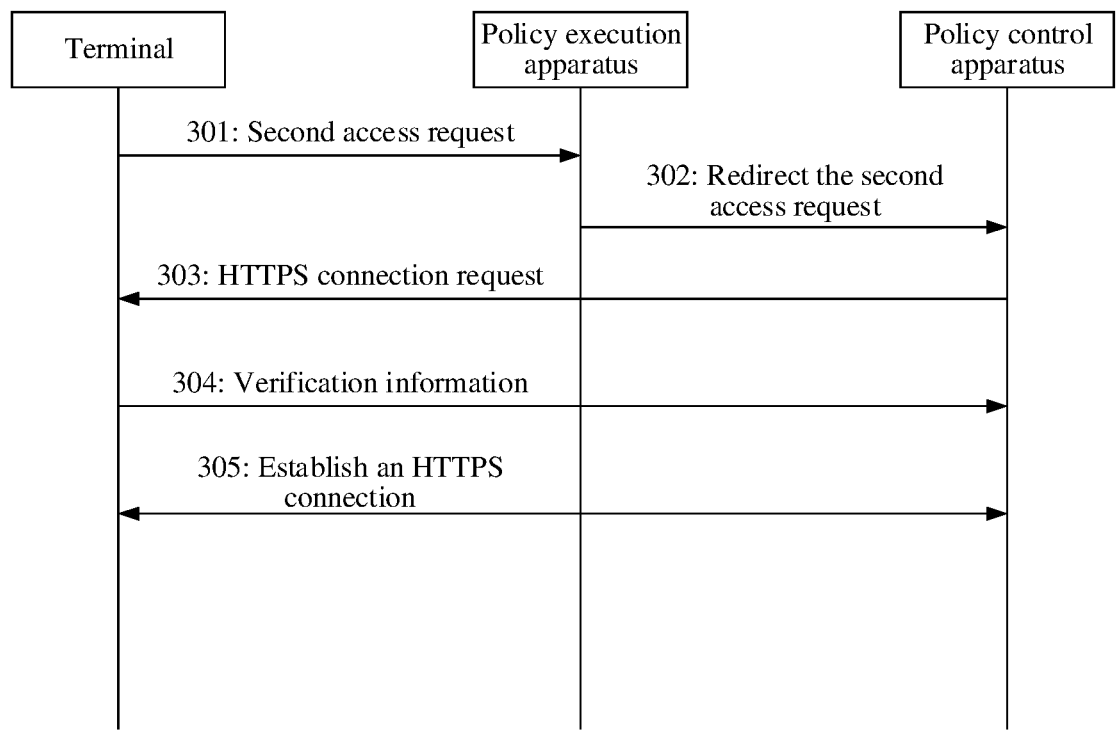
FIG. 3 is another flowchart of a method for determining a trusted terminal according to an embodiment of this disclosure.

Refer to FIG. 3. An embodiment of this disclosure provides another embodiment of a method for determining a trusted terminal. A major difference between this embodiment and the embodiment corresponding to FIG. 2 lies in that data of a service flow from a terminal first arrives at a policy execution apparatus. The policy execution apparatus detects whether an access request from the terminal is a request for first access. When the policy execution apparatus detects that the access request is a request for first access, the policy execution apparatus redirects the access request from the terminal to a policy control apparatus, so as to trigger the policy control apparatus to send an HTTPS connection request to the terminal.

Step 301: The terminal sends a second access request when the terminal accesses an application server.

The terminal sends the second access request based on an HTTPS protocol through a browser. The second access request carries a domain name (for example, sina.com) of the application server.

Step 302: The policy execution apparatus receives the second access request from the terminal, where the second access request does not carry a token, and the policy execution apparatus redirects the second access request to the policy control apparatus.

The policy execution apparatus detects whether the second access request carries a token allocated by the policy control apparatus. To be specific, the policy execution apparatus detects whether the second access request is a request for first access. A first access of the terminal to the application server refers to an access to the application server for the first time after the browser in the terminal is started.

It may be understood that the policy execution apparatus serves as a reverse proxy of the application server, and all the data of the service flow from the terminal arrives at the policy execution apparatus. When the policy execution apparatus determines that the second access request carries a token, the policy execution apparatus redirects the second access request to the policy control apparatus. An objective of redirection is to trigger the policy control apparatus to send an HTTPS connection request to the terminal (an environment awareness client).

For example, the second access request carries a destination address and a source address. The destination address is a domain name (for example, sina.com) of an application server to be accessed by the terminal. The source address is an internet protocol (IP) address of the terminal. A process in which the policy execution apparatus redirects the second access request to the policy control apparatus is used as an example for description.

The policy execution apparatus modifies the domain name carried in the second access request to modify the second access request, and adds a domain name of the policy control apparatus to the domain name. The modified domain name includes the domain name of the application server to be accessed and the domain name of the policy control apparatus. For example, the policy execution apparatus modifies the domain name "sina.com" to "W3.com@sina.com". "W3.com" is the domain name of the policy control apparatus, and "sina.com" is the domain name of the application server to be accessed by the terminal. Then, the policy execution apparatus sends the modified second access request to the policy control apparatus. After the second access request is redirected by the policy execution apparatus to the policy control apparatus, the policy control apparatus is triggered to send the HTTPS connection request to the terminal.

Step 303: The policy control apparatus receives the second access request redirected by the policy execution apparatus, and sends an HTTPS connection request to the terminal based on the second access request.

Step 304: The terminal receives the HTTPS connection request sent by the policy control apparatus, and sends verification information to the policy control apparatus based on the HTTPS connection request. The verification information is used by the policy control apparatus to perform verification on the terminal (the environment awareness client).

For this step, refer to the description in step 203 in the embodiment corresponding to FIG. 2. Details are not described herein again.

Step 305: The policy control apparatus establishes an HTTPS connection to the terminal after the verification performed by the policy control apparatus on the verification information succeeds, where the HTTPS connection established between the terminal and the policy control apparatus indicates that the terminal is a trusted terminal.

For this step, refer to the description in step 204 in the embodiment corresponding to FIG. 2. Details are not described herein again.

In this embodiment of this disclosure, in a zero trust architecture, the terminal sends the access request when accessing the application server. The access request from the terminal arrives at the policy execution apparatus. The policy execution apparatus detects whether the access request from the terminal is an access request sent to access the application server for the first time after the browser in the terminal is started. When the policy execution apparatus detects that the access request from the terminal is a request for first access, the policy execution apparatus redirects the access request from the terminal to the policy control apparatus, so as to trigger the policy control apparatus to send the HTTPS connection request to the terminal (the environment awareness client), so that the policy control apparatus establishes the HTTPS connection to the terminal, thereby improving security of the zero trust architecture.

In an application scenario, when a user wants to access an internal data resource of an enterprise, a terminal (such as a computer) of the user sends an access request. The access request carries a domain name (for example, abcd.com) of an application server. Access traffic of the terminal reaches a policy execution apparatus, and the policy execution apparatus detects that the access request is an access request sent to access the application server for the first time after a browser in the terminal is started (where the access request does not carry a token issued by the policy control apparatus). The policy execution apparatus redirects the access request to the policy control apparatus, so as to trigger the policy control apparatus to send an HTTPS connection request to the terminal (an environment awareness client). After the terminal (the environment awareness client) receives the HTTPS connection request sent by the policy control apparatus, the terminal sends an SSL certificate of the environment awareness client and an HTTPS response to the policy control apparatus. The policy control apparatus performs verification on verification information in the SSL certificate. After the verification on the SSL certificate succeeds, the policy control apparatus establishes an HTTPS connection to the terminal based on the HTTPS response, and the policy control apparatus determines that the terminal is a trusted terminal. The policy control apparatus further allocates one token to the terminal, and sends the token to the terminal. Further, the policy control apparatus sends a first indication to the policy execution apparatus (a reverse proxy of the application server). The first indication indicates that the terminal is a trusted terminal. Further, the policy execution apparatus continues to access the application server (for example, the domain name is abcd.com) based on the first indication, and sends, to the terminal, the data resource fed back by the application server.

Subsequently, if the user further wants to access another application server and does not exit from the browser in the current terminal, the terminal still maintains the HTTPS connection to the policy control apparatus. In this case, the terminal further sends an access request. The access request carries a domain name (for example, 1234.com) of an application server to be accessed and a token allocated by the policy control apparatus to the terminal. Access traffic (that is, data of a service flow) of the terminal still arrives at the policy execution apparatus. The policy execution apparatus detects that the access request carries a token, and sends the token to the policy control apparatus, to trigger the policy control apparatus to execute an authentication procedure. The authentication procedure is: The policy control apparatus compares the token received with a token stored internally. If the token received by the policy control apparatus is the same as the token stored internally, the authentication succeeds. The policy control apparatus feeds back the first indication to the policy execution apparatus. The policy execution apparatus accesses a corresponding application server (where a domain name is 1234.com) based on the first indication, and sends, to the terminal, a data resource fed back by the application server.

It may be understood that, in this embodiment of this disclosure, when the terminal establishes the HTTPS connection to the policy control apparatus, it indicates that the environment awareness client is deployed in the terminal, and the policy control apparatus determines that the terminal is a trusted terminal. If the environment awareness client in the terminal is abnormally uninstalled, when the policy control apparatus sends the HTTPS connection request to the terminal, the terminal does not send the verification information and an HTTPS connection response to the policy control apparatus. In this case, the policy control apparatus determines that the environment awareness client in the terminal is abnormal (may be abnormally uninstalled), and the environment awareness client cannot collect a dangerous event in the terminal. Consequently, a security risk occurs in an entire zero trust system, and the policy control apparatus no longer releases the access request from the terminal. To be specific, the policy execution apparatus is notified that there is need to continue to access the application server that the terminal requests to access, so as to ensure security of the zero trust system.

Figure 4:
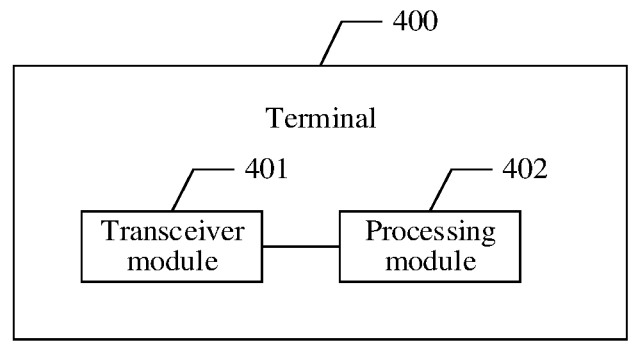
FIG. 4 is a schematic diagram of a structure of a terminal according to an embodiment of this disclosure.

Corresponding to the method for determining a trusted terminal provided in embodiments of this disclosure, the following describes an apparatus to which the method is applied. Refer to FIG. 4. This disclosure provides an embodiment of a terminal 400. The terminal 400 includes a transceiver module 401 and a processing module 402.

The transceiver module 401 is configured to send an access request when the terminal accesses an application server.

The transceiver module 401 is further configured to receive an HTTPS connection request sent by a policy control apparatus. The HTTPS connection request is sent by the policy control apparatus based on the access request.

The transceiver module 401 is further configured to send verification information to the policy control apparatus based on the HTTPS connection request. The verification information is used by the policy control apparatus to perform verification on the terminal.

The processing module 402 is configured to establish an HTTPS connection to the policy control apparatus when the verification performed by the policy control apparatus on the terminal succeeds. The HTTPS connection established between the terminal and the policy control apparatus indicates that the terminal is a trusted terminal.

Optionally, the transceiver module 401 is replaced with a receiving module and a sending module.

Optionally, the transceiver module 401 is a communication interface, and the processing module 402 is a logic circuit.

Optionally, the communication interface is an input/output interface or a transceiver circuit. The input/output interface includes an input interface and an output interface. The transceiver circuit includes an input interface circuit and an output interface circuit.

In an implementation, the processing module 402 is a processing apparatus, and some or all functions of the processing apparatus are implemented by software.

Optionally, some or all functions of the processing apparatus are implemented by software. In this case, the processing apparatus includes a memory and a processor. The memory is configured to store a computer program. The processor reads and executes the computer program stored in the memory, to perform corresponding processing and/or steps in any method embodiments.

Optionally, the processing apparatus includes only a processor. A memory configured to store a computer program is located outside the processing apparatus, and the processor is connected to the memory through a circuit/wire, to read and execute the computer program stored in the memory.

Optionally, some or all functions of the processing apparatus are implemented by hardware. In this case, the processing apparatus includes an input interface circuit, a logic circuit, and an output interface circuit.

Further, the transceiver module 401 is configured to perform step 201 and step 203 in the embodiment corresponding to FIG. 2 and step 301 and step 304 in the embodiment corresponding to FIG. 3. For details, refer to descriptions of related steps in the foregoing method embodiments. Details are not described herein again. The processing module 402 is configured to perform step 204 in the embodiment corresponding to FIG. 2 and step 305 in the embodiment corresponding to FIG. 3. For details, refer to descriptions of related steps in the foregoing method embodiments. Details are not described herein again.

Figure 5:
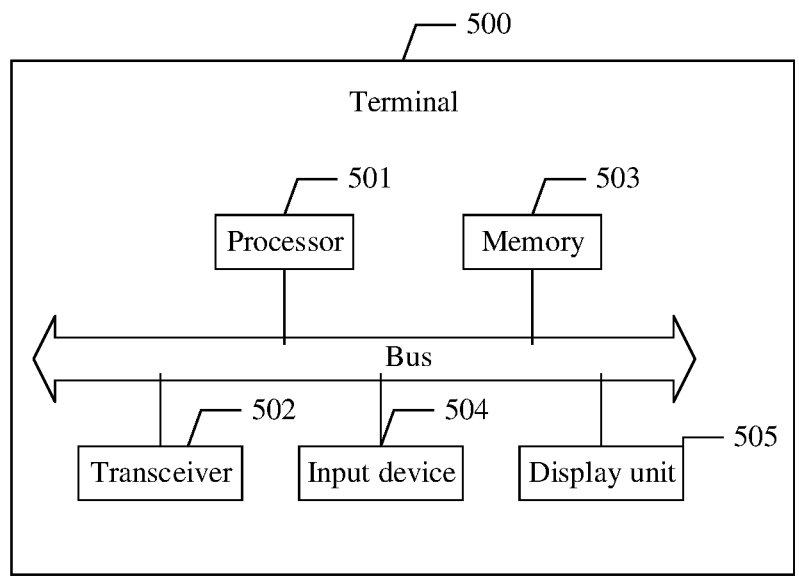
FIG. 5 is a schematic diagram of another structure of a terminal according to an embodiment of this disclosure.

Refer to FIG. 5. An embodiment of this disclosure provides an embodiment of a terminal. A terminal 500 includes a processor 501, a transceiver 502, a memory 503, an input device 504, and a display unit 505. The processor 501, the transceiver 502, the memory 503, the input device 504, and the display unit 505 are connected through a bus. The processor 501, the transceiver 502, the memory 503, the input device 504, and the display unit 505 communicate with each other through an internal connection path, to transfer a control signal and/or a data signal. The memory 503 is configured to store a computer program. The processor 501 is configured to invoke the computer program from the memory 503 and run the computer program, so as to control the transceiver 502 to send and receive a signal. Optionally, the terminal 500 further includes an antenna. The transceiver 502 transmits or receives a radio signal through the antenna.

Optionally, the processor 501 and the memory 503 are combined into one processing apparatus, and the processor 501 is configured to execute program code stored in the memory 503 to implement the foregoing functions. Optionally, the memory 503 is also integrated into the processor 501. Alternatively, the memory 503 is independent of the processor 501, to be specific, is located outside the processor 501.

The input device 504 may be configured to receive input digit or character information, and generate a key signal input related to user settings and function controls of the terminal. Specifically, the input device 504 may include a touch panel and another input apparatus. The touch panel, also referred to as a touchscreen, may collect a touch operation of a user on or near the touch panel. The another input apparatus includes but is not limited to one or more of a physical keyboard, a function key (such as a volume control key or an on/off key), and a mouse. For example, in this disclosure, the input device 504 is configured to receive a domain name that is of an application server to be accessed and that is entered by the user.

The display unit 505 may be configured to display information input by the user or information provided for the user. The display unit 505 may include a display panel. Optionally, the display panel is configured in a form of a liquid crystal display (LCD), an organic light-emitting diode (OLED), or the like. For example, in this disclosure, the display unit 405 is configured to display a data resource fed back by an application server.

The processor 501 is configured to read the computer program stored in the memory 503, so that the terminal 500 performs the steps performed by the terminal in the foregoing method embodiments. For details, refer to the descriptions in the foregoing method embodiments. Details are not described herein again.

In addition, in an optional design, the processing and/or operations performed by the transceiver module 401 in FIG. 4 are implemented by the transceiver 502 shown in FIG. 5. For details, refer to the detailed description in the method embodiments. Details are not described herein again. The processing and/or operations performed by the processing module 402 in FIG. 4 are implemented by the processor 501 shown in FIG. 5.

Figure 6:
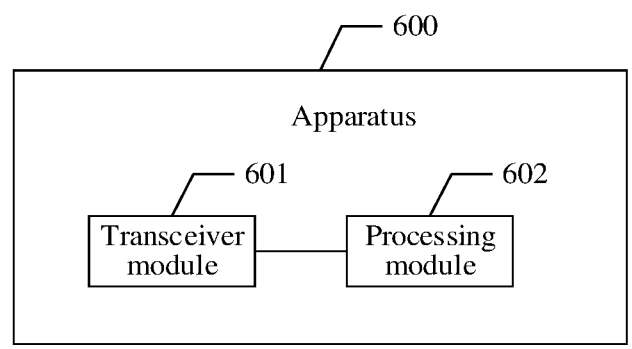
FIG. 6 is a schematic diagram of a structure of an apparatus according to an embodiment of this disclosure.

Refer to FIG. 6. An embodiment of this disclosure provides an apparatus 600. The apparatus 600 includes a transceiver module 601 and a processing module 602. In an optional design, the apparatus 600 is the policy control apparatus in the foregoing method embodiments, and is configured to execute a function of the policy control apparatus in the foregoing method embodiments. The apparatus 600 is configured to perform corresponding operations and/or processing performed by the policy control apparatus in the foregoing method embodiments.

The transceiver module 601 is configured to receive a first access request from a terminal.

The transceiver module 601 is further configured to send an HTTPS connection request to the terminal based on the first access request.

The transceiver module 601 is further configured to receive verification information from the terminal. The verification information is sent by the terminal for the HTTPS connection request.

The processing module 602 is configured to perform verification on the terminal based on the verification information.

The processing module 602 is further configured to establish an HTTPS connection to the terminal when the verification on the terminal succeeds. The HTTPS connection established between the policy control apparatus and the terminal indicates that the terminal is a trusted terminal.

Further, the transceiver module 601 is configured to perform step 202 in the embodiment corresponding to FIG. 2 and step 303 in the embodiment corresponding to FIG. 3. For details, refer to descriptions of related steps in the foregoing method embodiments. Details are not described herein again. The processing module 602 is configured to perform step 204 in the embodiment corresponding to FIG. 2 and step 305 in the embodiment corresponding to FIG. 3. For details, refer to descriptions of related steps in the foregoing method embodiments. Details are not described herein again.

Optionally, the transceiver module 601 is replaced with a receiving module and a sending module.

Optionally, the transceiver module 601 is a communication interface, and the processing module 602 is a logic circuit.

Optionally, the communication interface is an input/output interface or a transceiver circuit. The input/output interface includes an input interface and an output interface. The transceiver circuit includes an input interface circuit and an output interface circuit.

In an implementation, the processing module 602 is a processing apparatus, and some or all functions of the processing apparatus are implemented by software.

Optionally, some or all functions of the processing apparatus are implemented by software. In this case, the processing apparatus includes a memory and a processor. The memory is configured to store a computer program. The processor reads and executes the computer program stored in the memory, to perform corresponding processing and/or steps in any method embodiments.

Optionally, the processing apparatus includes only a processor. A memory configured to store a computer program is located outside the processing apparatus, and the processor is connected to the memory through a circuit/wire, to read and execute the computer program stored in the memory.

Optionally, some or all functions of the processing apparatus are implemented by hardware. In this case, the processing apparatus includes an input interface circuit, a logic circuit, and an output interface circuit.

In an optional design, as shown in FIG. 6, the apparatus 600 is the policy execution apparatus in the foregoing method embodiments. The apparatus 600 is configured to perform corresponding operations and/or processing performed by the policy execution apparatus in the foregoing method embodiments.

The transceiver module 601 is configured to receive an access request from a terminal.

The processing module 602 is configured to redirect the access request to a policy control apparatus when the access request does not carry a token allocated by the policy control apparatus. After being redirected to the policy control apparatus, the access request triggers the policy control apparatus to send an HTTPS connection request to the terminal. The HTTPS connection request is used to trigger the terminal to send verification information to the policy control apparatus. The verification information is used by the policy control apparatus to perform verification on the terminal.

Further, the transceiver module 601 is configured to perform the step of "receiving a second access request from the terminal" in step 302 in the embodiment corresponding to FIG. 3. The processing module 602 is configured to perform the step of "redirecting the second access request to the policy control apparatus" in step 302 in the embodiment corresponding to FIG. 3. For details, refer to descriptions of related steps in the foregoing method embodiments. Details are not described herein again.

Figure 7:
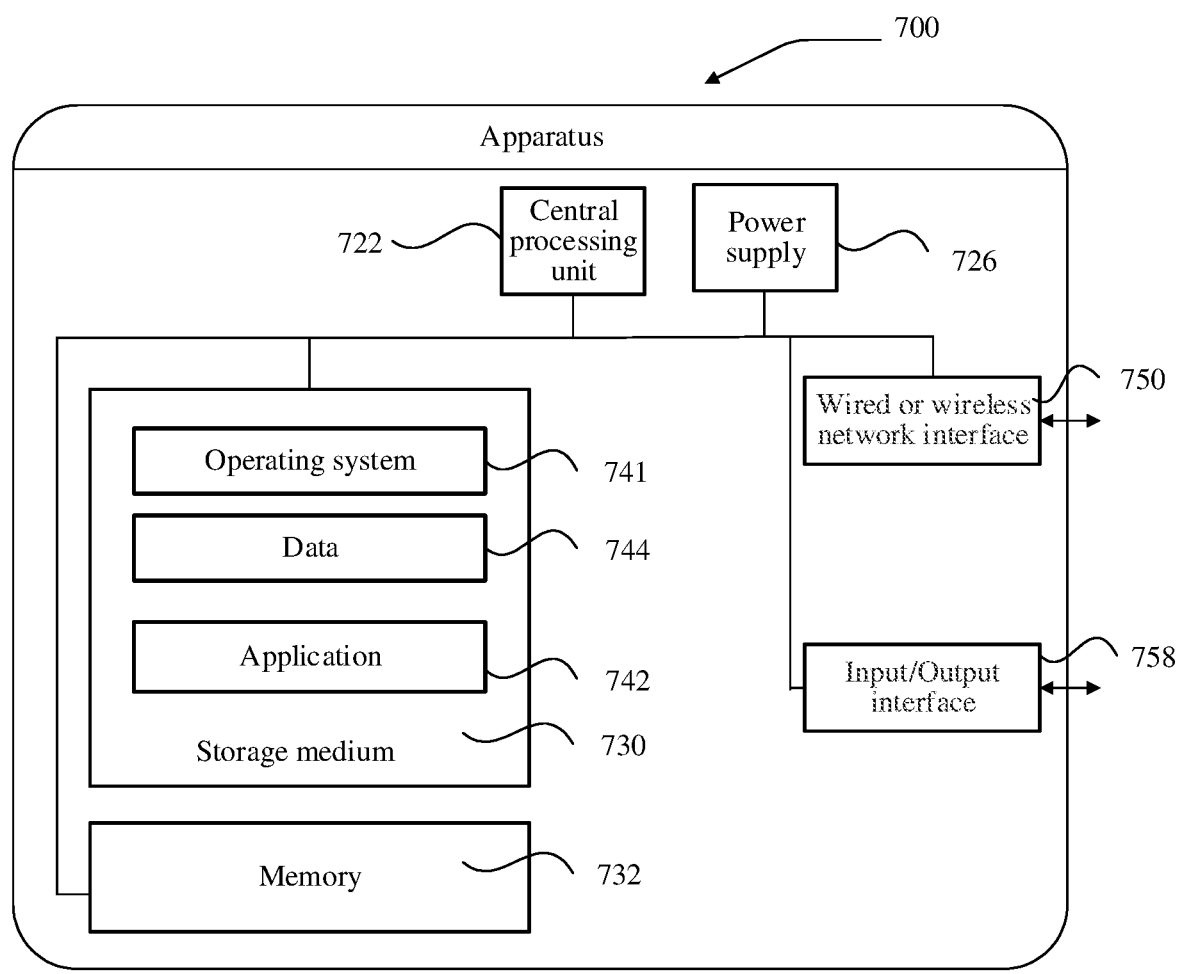
FIG. 7 is a schematic diagram of another structure of an apparatus according to an embodiment of this disclosure.

Refer to FIG. 7. This disclosure provides an apparatus 700. The apparatus 700 is the policy control apparatus in the foregoing method embodiments. Alternatively, the apparatus 700 is the policy execution apparatus in the foregoing method embodiments. Alternatively, the apparatus 700 is the policy detection apparatus in the foregoing method embodiments. In this embodiment, the apparatus is described by using a server as an example. The apparatus 700 includes one or more central processing units (CPUs) 722 (for example, one or more processors) and memories 732, and one or more storage media 730 (for example, one or more mass storage devices) that store an application 742 or data 744. Optionally, the memory 732 and the storage medium 730 are transient storage or persistent storage. A program stored in the storage medium 730 includes one or more modules (not shown in the figure), and each module includes a series of instruction operations for the apparatus. Further, the central processing unit 722 is configured to communicate with the storage medium 730, and perform, on the apparatus 700, the series of instruction operations in the storage medium 730.

Optionally, the apparatus 700 further includes one or more power supplies 726, one or more wired or wireless network interfaces 750, one or more input/output interfaces 758, and/or one or more operating systems 741.

In a possible design, the apparatus 700 is the policy control apparatus in the foregoing method embodiments. When the apparatus 700 is configured to execute a function of the policy control apparatus in the foregoing method embodiments, the processor is configured to read a computer program stored in the at least one memory, so that the apparatus performs the steps performed by the policy control apparatus in the foregoing method embodiments.

In a possible design, the apparatus 700 is the policy execution apparatus in the foregoing method embodiments. When the apparatus 700 is configured to execute a function of the policy execution apparatus in the foregoing method embodiments, the processor is configured to read a computer program stored in the at least one memory, so that the apparatus performs the steps performed by the policy execution apparatus in the foregoing method embodiments.

In addition, in an optional design, a function of the transceiver module 601 in FIG. 6 is executed by the network interface 750 in FIG. 7. A function of the processing module 602 in FIG. 6 is executed by the central processing unit 722 in FIG. 7.

Refer to FIG. 1A and FIG. 1B. An embodiment of this disclosure further provides a system for determining a trusted terminal. The system is a communication system of a zero trust architecture. The system includes a terminal and a policy control apparatus. Optionally, the system further includes a policy execution apparatus. The terminal is configured to perform the steps performed by the terminal in the foregoing method embodiments. The policy control apparatus is configured to perform the steps performed by the policy control apparatus in the foregoing method embodiments. The policy execution apparatus is configured to perform the steps performed by the policy execution apparatus in the foregoing method embodiments. For functions of the apparatuses, refer to descriptions of the foregoing method embodiments. Details are not described herein again.

An embodiment of this disclosure provides a computer-readable medium. The computer-readable storage medium is configured to store a computer program. When the computer program is run on a computer, the computer is enabled to perform the method performed by the terminal in the foregoing method embodiments. Alternatively, when the computer program runs on a computer, the computer is enabled to perform the method performed by the policy control apparatus in the foregoing method embodiments. Alternatively, when the computer program is run on a computer, the computer is enabled to perform the method performed by the policy execution apparatus in the foregoing method embodiments.

An embodiment of this disclosure provides a chip. The chip includes a processor and a communication interface. The communication interface is, for example, an input/output interface, a pin, a circuit, or the like. The processor is configured to read instructions to perform the method performed by the terminal in the foregoing method embodiments. Alternatively, the processor is configured to read instructions to perform the method performed by the policy control apparatus in the foregoing method embodiments. Alternatively, the processor is configured to read instructions to perform the method performed by the policy execution apparatus in the foregoing method embodiments.

An embodiment of this disclosure provides a computer program product. When the computer program product is executed by a computer, the method performed by the terminal in the foregoing method embodiments is implemented. Alternatively, when the computer program product is executed by a computer, the method executed by the policy control apparatus in the foregoing method embodiments is implemented. Alternatively, when the computer program product is executed by a computer, the method executed by the policy execution apparatus in the foregoing method embodiments is implemented.

Optionally, the processor mentioned in any one of the foregoing is a general-purpose central processing unit (CPU), a microprocessor, an application-specific integrated circuit (ASIC), or one or more integrated circuits configured to control program execution of the wireless communication method in the first aspect.

A person skilled in the art can clearly understand that, for the purpose of convenient and brief description, for detailed working processes of the foregoing systems, apparatuses, and units, refer to corresponding processes in the foregoing method embodiments. Details are not described herein again.

The foregoing embodiments are merely intended to describe the technical solutions of this disclosure, but not to limit this disclosure. Although this disclosure is described in detail with reference to the foregoing embodiments, a person of ordinary skill in the art should understand that modifications can still be made to the technical solutions described in the foregoing embodiments, or equivalent replacements can still be made to some technical features thereof, without departing from the scope of the technical solutions of embodiments of this disclosure.

What is claimed is:

1. A terminal comprising:
   at least one processor and a memory coupled with the at least one processor, wherein the memory storing instructions, when executed by the at least one processor, cause the terminal to at least be configured to:
   send an access request when the terminal accesses an application server, wherein
   receive a hypertext transfer protocol over secure socket layer (HTTPS) connection request sent by a policy control apparatus, wherein the HTTPS connection request is sent by the policy control apparatus based on the access request; and
   send verification information to the policy control apparatus based on the HTTPS connection request, wherein the verification information is used by the policy control apparatus to perform verification on the terminal; and
   establish an HTTPS connection to the policy control apparatus when the verification performed by the policy control apparatus on the terminal succeeds, wherein the HTTPS connection established between the terminal and the policy control apparatus indicates that the terminal is a trusted terminal.

2. The apparatus according to claim 1, wherein the verification information is comprised in a secure sockets layer (SSL) certificate.

3. A policy control apparatus comprising:
   at least one processor and a memory coupled with the at least one processor, wherein the memory storing instructions, when executed by the at least one processor, cause the policy control apparatus to at least be configured to:
   receive a first access request from a terminal;
   send a hypertext transfer protocol over secure socket layer (HTTPS) connection request to the terminal based on the first access request; and
   receive verification information from the terminal, wherein the verification information is sent by the terminal based on the HTTPS connection request;
   perform verification on the terminal based on the verification information, and
   establish an HTTPS connection to the terminal when the verification on the terminal succeeds, wherein the HTTPS connection established between the policy control apparatus and the terminal indicates that the terminal is a trusted terminal.

4. The policy control apparatus according to claim 3, wherein the instructions when executed by the at least one processor further cause the policy control apparatus to be configured to:
   determine that the terminal is an untrusted terminal when the verification on the terminal fails.

5. The policy control apparatus according to claim 3, wherein the verification information is comprised in a secure sockets layer (SSL) certificate.

6. The policy control apparatus according to claim 4, wherein the verification information is comprised in a secure sockets layer (SSL) certificate.

7. The policy control apparatus according to claim 3, wherein the instructions when executed by the at least one processor further cause the policy control apparatus to be configured to:
   receive a second access request redirected by a policy execution apparatus, wherein the second access request is from the terminal, and the second access request does not carry a token allocated by the policy control apparatus.

8. A system for determining a trusted terminal, the system comprising:
   a terminal comprising at least one first processor and a first memory coupled with the at least one first processor, wherein the first memory storing instructions, when executed by the at least one first processor, cause the terminal to send a first access request when accessing an application server;

a policy control apparatus comprising at least one second processor and a second memory coupled with the at least one second processor, wherein the second memory storing instructions, when executed by the at least one second processor, cause the policy control apparatus to be configured to receive the first access request, and send a hypertext transfer protocol over secure socket layer (HTTPS) connection request to the terminal based on the first access request;

wherein the instructions in the first memory when executed by the first processor further cause the terminal to be configured to: receive the HTTPS connection request, and send verification information to the policy control apparatus based on the HTTPS connection request; and wherein the instructions in the second memory when executed by the second processor further cause the policy control apparatus to be configured to: receive the verification information, perform verification on the terminal based on the verification information, and establish an HTTPS connection to the terminal when the verification on the terminal succeeds, wherein the HTTPS connection established between the policy control apparatus and the terminal indicates that the terminal is a trusted terminal.

9. The system according to claim 8, wherein the system further comprises a policy execution apparatus comprising at least one third processor and a third memory coupled with the at least one third processor, wherein the third memory storing instructions, when executed by the at least one third processor, cause the policy execution apparatus to be configured to:

receive a second access request from the terminal, wherein the second access request does not carry a token allocated by the policy control apparatus; and redirect the second access request to the policy control apparatus; and the instructions in the second memory when executed by the second processor further cause the policy control apparatus to be configured to:

receive the second access request redirected by the policy execution apparatus, and send another HTTPS connection request to the terminal based on the second access request.

10. The system according to claim 8, wherein the instructions in the second memory when executed by the second processor further cause the policy control apparatus to be configured to:

determine the terminal is an untrusted terminal when the verification on the terminal fails.

11. The system according to claim 8, wherein the verification information is comprised in a secure sockets layer (SSL) certificate.

12. The system according to claim 9, wherein the verification information is comprised in a secure sockets layer (SSL) certificate.

13. The system according to claim 10, wherein the verification information is comprised in a secure sockets layer (SSL) certificate.

14. The system according to claim 8, wherein the policy execution apparatus is a network forwarding device, and the network forwarding device comprises a firewall, a switch, a router, a gateway, and a bridge; and the policy control apparatus is a computer device, and the policy execution apparatus is communicatively connected to the policy control apparatus.

15. The apparatus according to claim 2, wherein the secure sockets layer (SSL) certificate at least includes a certificate authority (CA) and a public key.

16. The policy control apparatus according to claim 5, wherein the secure sockets layer (SSL) certificate at least includes a certificate authority (CA) and a public key.

17. The system according to claim 11, wherein the secure sockets layer (SSL) certificate at least includes a certificate authority (CA) and a public key.

18. The system according to claim 9, wherein the policy execution apparatus is further configured to: after the HTTPS connection is established between the policy control apparatus and the terminal, receive a first indication sent by the policy control apparatus, and cache the first indication for a preset duration of time.

19. The system according to claim 8, wherein the system further comprises a policy execution apparatus comprising at least one third processor and a third memory coupled with the at least one third processor, wherein the third memory storing instructions, when executed by the at least one third processor, cause the policy execution apparatus to be configured to:

receive a second access request from the terminal; and redirect the second access request to the policy control apparatus based on a detection that the second access request is a request for first access of the terminal to the application server.

* * * * *